March 8, 1932.    U. F. L. STEINDORFF ET AL    1,848,145
POWER DRIVEN SHEARS
Filed Dec. 28, 1927    2 Sheets-Sheet 1
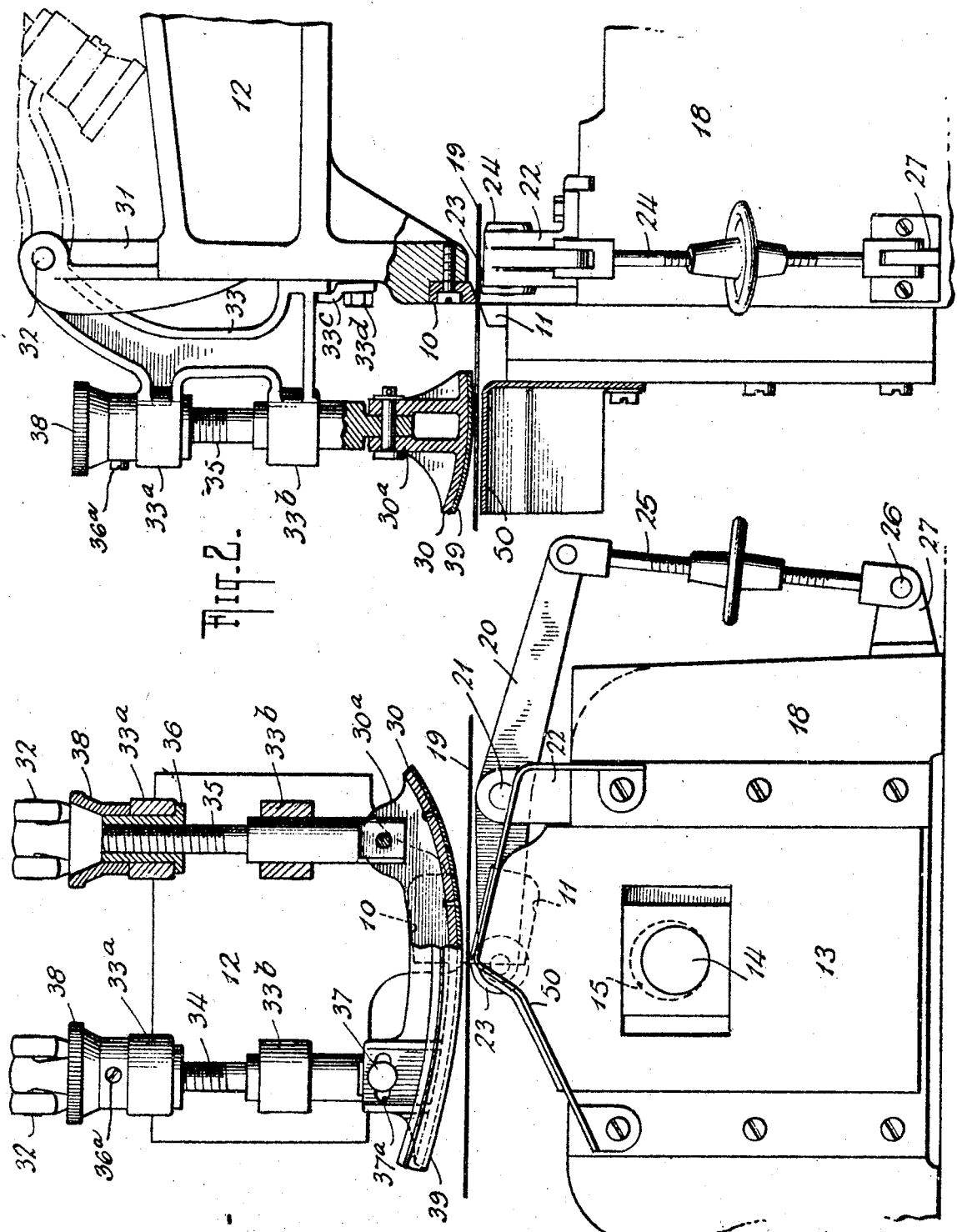
INVENTORS
Gustave A. Ungar
AND
BY Ulrich F. L. Steindorff,
Lotka, Kehlenbeck & Harley
ATTORNEYS March 8, 1932. U. F. L. STEINDORFF ET AL 1,848,145
POWER DRIVEN SHEARS
Filed Dec. 28, 1927 2 Sheets-Sheet 2
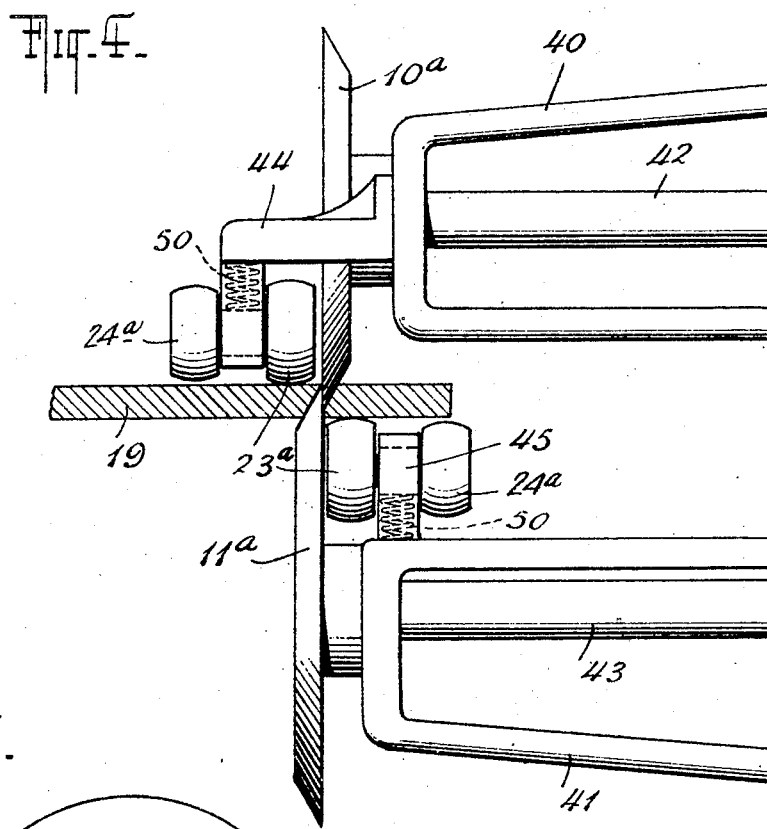
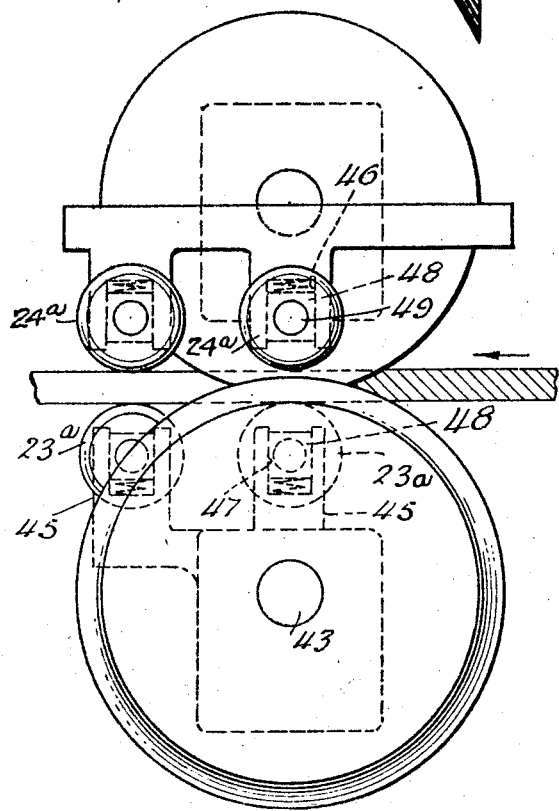
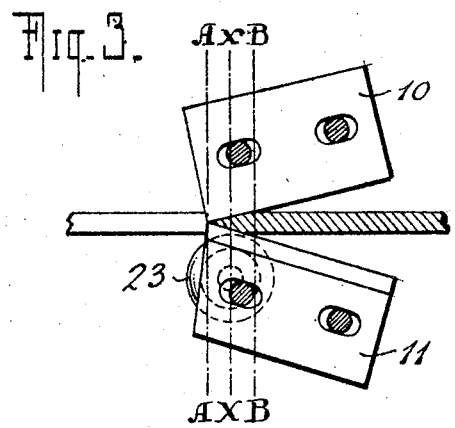
INVENTORS
GUSTAVE A. UNGAR
AND ULRICH F. L. STEINDORFF
BY
Lotka, Kehlenbeck Farley
ATTORNEYS Patented Mar. 8, 1932

1,848,145

UNITED STATES PATENT OFFICE

ULRICH F. L. STEINDORFF, OF NEW YORK, AND GUSTAVE A. UNGAR, OF PELHAM MANOR, NEW YORK

POWER DRIVEN SHEARS

Application filed December 28, 1927. Serial No. 243,171.

This invention relates to power driven shears of the type employed for the cutting of sheet materials such as metal, leather, cardboard or the like, and particularly to such type of shears in which the action of the cutting elements in performing a cut serves to impart a feeding of the work to the cutting edges of said elements.

The invention relates more particularly to shears of the type in which a pair of relatively short cutting blades are arranged with their cutting edges at an angle to provide an open throat to which the sheet material is fed, one of said blades being held stationary and the other being rapidly reciprocated to cause the moving blade to travel towards the stationary blade to perform the shearing cut. As a result of the rapid reciprocation of the blade of this type of shears, especially when heavier materials are cut, the work is sometimes caused to be vibrated to an extent such that it is difficult for the operator to follow, with sufficient accuracy, the cutting line usually scribed on the material.

The object of the present invention is to provide a new and improved device that will eliminate this vibration, which construction may either be incorporated as a part of the original shears in the manufacture thereof, or which may be built as an attachment capable of being installed on an existing shears.

Another object is to provide a new and improved construction of a device for minimizing distortion of the material being cut due to the pressure exerted by the shears in performing the shearing operation.

A further object is to provide a construction in which the device is self or automatically adjusted according to the thickness of the sheet material being cut.

These and other objects will appear more fully from the following more detailed description and by reference to the accompanying drawings forming a part hereof, and wherein Fig. 1 is a front elevation, showing a shears of the type hereinbefore referred to having attached thereto a pair of reaction supports made in accordance with the principles of our invention, parts of said device being shown in section; Fig. 2 is a side elevation, partly broken away and partially in section, of the structure shown in Fig. 1; Fig. 3 is an enlarged detail of the pair of cutting blades showing somewhat diagrammatically the zone of cutting action and the relation of the reaction supports thereto; Fig. 4 is a side view of a roller type shear showing an application of the principles of the invention to this type of shears, and Fig. 5 is a front view of the structure shown in Fig. 4.

As shown by way of example in Figs. 1 to 3 inclusive, in which the invention is illustrated in connection with a reciprocating shears, the shears comprises a pair of cutting blades 10, 11, the blade 10 being stationarily held in any suitable support such as the frame arm 12, and the blade 11 being secured to a movable cutter or blade holder 13 driven by an eccentric throw 14 of a drive shaft 15, the latter being driven preferably at a high speed by any suitable source of power, such as an electric motor, (not shown). The blade holder 13, drive shaft 15 and electric motor in the example shown, are mounted on the frame or base 18.

It sometimes happens with a shears of the type under discussion, particularly when heavier materials are being cut, that objectionable vibration of the sheet is set up, which vibration makes it very difficult to guide accurately the sheet to the blades in cutting to the line usually scribed upon the work for indicating the outline to be cut. This vibration is caused largely by the fact that the moving blade 11 in performing a cutting stroke exerts a pressure against the work 19 which tends to rotate the latter in a clockwise direction (as seen in Fig. 2), about the edge of the stationary blade, the latter acting as a fulcrum. As the extent of reciprocation of the moving blade is relatively small the extent of this movement of rotation imparted to the work is also small, but as the blade is reciprocated rapidly, the rapid succession of rotational impulses produces the vibration above referred to especially during the cutting of heavier materials which offer much resistance to the shearing action.

We have discovered that this vibration can be entirely eliminated by providing, at a suitable point, a pair of reaction supports which will engage against the work in such a manner as to resist and prevent the rotation above described. A satisfactory constructional example of such a pair of supports, as shown in Figs. 1 and 2, comprises upper and lower members. The lower member consists of a lever 20 pivoted between its ends, as at 21, to a fixed part of the shears. As shown, a bracket 22 is secured to the frame or base 18 and carries the pivot pin 21 upon which said lever is mounted. The lever 20 preferably extends parallel to the cutting blades and, for the purpose of permitting free movement of the work, its inner end is provided with a pair of rollers 23, 24, upon the periphery of which the lower face or surface of the work 19 is supported. The roller 23 is preferably located as close as possible to the moving blade 11 without contacting with said blade or otherwise interfering with its movement, and the point of engagement of roller 23 with the work is located preferably approximately at the center of the effective zone of cutting action of the blades.

By the effective zone of cutting action of the blades is meant the length of the cutting edges thereof which perform a cutting action during each stroke of the movable blade. By referring to Fig. 3, it will be seen that this cutting zone of the blades 10 and 11 is located between the lines A—A and B—B and that the axis of the roller 23 is located upon the line X—X which is approximately midway between the lines A—A and B—B.

Although a pair of rollers 23, 24 may be employed for engaging the upper face of the work sheet on the side of the cutting blades opposite to which the lower face of said sheet is engaged by the lower rollers, we have found it better to use a normally fixed or stationary member instead of the rotatable rollers. Such a member as shown in Figs. 1 and 2 may be in the form of a casting having a plate 30 at the bottom thereof, and a pair of spaced, upwardly extending webs 30ª. In the constructional example shown, a pair of bearing brackets 31 is rigidly secured to the frame arm 12, each of said brackets being provided with bearings 31ª in which pivot pins 32 are mounted. Said pins serve as pivotal supports for brackets 33, each of which has an upper and a lower boss 33ª, 33ᵇ respectively. The bosses of each bracket are in axial alignment and serve as mountings for adjusting screws 34, 35. The upper ends of the screws 34, 35 are threaded for engagement with nuts 36 rotatably mounted in the upper bosses 33ª, while the lower ends of the screws fit slidably in the bosses 33ᵇ and terminate in reduced flattened tongues which extend between the webs 30ª of the member 30. The reduced lower ends of the screws are pivotally connected to the member 30 by pins 37 which pass through the tongues and said webs.

Any suitable means, such as the knurled handwheels 38, which, as shown, are non-rotatably secured to the nuts 36 by the set screws 36ª, may be provided for rotating the nuts 36 to adjust the position of the plate 30 relatively to the work. In order to obviate any binding of the screws, the apertures 37ª of the web 30ª, through which the pin 37 passes for connecting the screw 34 to the member 30, are made elongated thereby permitting longitudinal movement of one screw while the other screw remains stationary. The lower face of the member 30 is preferably covered with a mat 39 of leather or other suitable material to deaden noise.

It will be noted that the lower face of the member 30 is of curved contour in both directions, that is to say, both longitudinally and transversely. The longitudinal curvature permits the work to be fed readily to the blades while the transverse curvature permits curved outlines to be cut more readily. The longitudinal curvature, as shown in Fig. 1, is preferably made substantially parabolic, so that when changes in the adjustment of the member 30 are made the low point of the curve will always be located approximately at the center of the cutting zone. The transverse curvature of the member 30 is also preferably substantially parabolic as shown in Fig. 2, the low point of the curve being located at the side of said member nearest to the cutting blades.

In cutting curved outlines experience has shown that the best results can be obtained by inclining the work sheet to the horizontal, in one direction or the other, according to the direction of curvature of the cut to be made. This inclination of the work sheet is permitted, on the one hand, by the transverse curvature of the plate 30 and on the other hand, by making the roller 24 slightly smaller in diameter than the rolls 23.

Spaced immediately below the member 30 is a supporting bracket or table 50 suitably secured to the base 18. The top of such bracket extends at an angle to the horizontal plane in which the work sheet will normally be held so that an open throat is provided between the upper member 30 and the table 50 into which the work may be easily fed to the cutting blades. The construction and arrangement of the table is preferably such that, as shown in Fig. 1, it forms a relatively small supporting surface for the work sheet which surface is located approximately in alignment with the effective cutting zone of the shear blades.

As hereinbefore described the brackets 33 are pivotally mounted on the pins 32 so that, if for any reason it is not desired to use the anti-vibration member 30, it may be rotated upon said pins upwardly and rearwardly to rest in an out-of-the-way inoperative position upon the top of the frame arm 12, as indicated by the dot and dash line showing in Fig. 2. In order to lock the member 30 in its operative position, latches 33°, pivotally secured as by the bolts 33ᵈ to the front face of the frame arm 12, are provided for engagement with brackets 33. When swinging the member 30 to and from its inoperative position said member serves as a connecting bar which serves to cause the two brackets 33 to be swung simultaneously upon the pivot pins 32.

The outer end of the lever 20 is pivotally connected to one end of a link 25, the other end of which is pivotally anchored at 26, to any suitable fixed support such as the bracket 27 secured to the base 18.

The provison of the roller 23 not only prevents the objectionable vibration of the sheet, but also serves to reduce distortion or bending of the sheet by the shears to a minimum. In addition, the placing of the roller 23 close to the blades renders it possible to run a cut very much closer to the edge of a sheet than would otherwise be possible. By using the roller, located as described, a cut can readily be run along the edge of a sheet, the width of the material being removed by such cut being approximately equal to the thickness of the sheet.

While our invention has been described above in connection with a rapidly reciprocating blade, it is not limited in its application to reciprocating shears, but is equally adapted for use with other shears, Figs. 4 and 5 showing by way of example, an application of the invention to a so-called rotary shears, which, as shown in these figures, consists of a pair of round discs, 10ª, 11ª placed in juxtaposition with their sharpened cutting edges slightly overlapping, and rotated in opposite directions by any suitable driving means, the work 19 being fed to the cutters in the direction indicated by the arrow in Fig. 5 so that the rotation of the cutters tends to pull the work inwardly against the cutting edges.

Shears of rotary type are subject to the objection that they cause a greater amount of distortion or bending of the work than occurs with the short stroke rapidly reciprocating type of shears. The application of our invention to the rotary type shears overcomes this objection. As shown in Figs. 4 and 5, in order to overcome this bending, two sets of rollers, each consisting of two pairs of rollers 23ª, 24ª, are preferably provided, one set being placed to engage the upper face of the work 19 and the other set being placed to engage the lower face of said work. Any suitable means can be employed for mounting the rollers, as shown, the brackets 40, 41, in which are mounted the shafts 42, 43, for the upper and lower cutters respectively, are provided with extensions 44, 45 having guideways 46, 47. Each of said guideways has mounted therein a bearing block 48 which carries the shaft 49 upon which the rollers are mounted. A spring 50 is mounted between each bearing block and the inner end of its respective guideway and serves to press the rollers against the work. It will be noted that two pairs of rollers are mounted opposite to each other approximately midway of the cutting zone, one pair on each side of the work and that the other two pairs of rollers are also oppositely located but at a slight distance to the rear of the cutting zone.

In practice the reaction supports occupy rigidly resistant operative positions in which any tendency of the material 19 to vibrate is effectively resisted. As previously described with respect to Figs. 1 and 2 and as shown therein, the reaction supports may be arranged so to be capable of being swung to an inoperative out-of-the-way position when for any reason this should be desired, as for instance when said reaction supports are not required.

While we have shown the combination of a stationary member and one pair of rollers with a reciprocating shears for engaging the upper and lower faces of the work and a plurality of pairs of rollers in combination with the rotary shears for engaging both sides of the work, it will be obvious that the rollers and stationary members may be used interchangeably with either type of shears.

It will also be understood that many other variations, changes, and modifications of the constructional details of the examples selected for illustration may also be resorted to without departing from the spirit of our invention.

We claim:

1. The combination with a shears for cutting sheet material and having a pair of cutters, of a reaction support placed closely adjacent one of said cutters for engaging one side of the material being cut at a point opposite to the other of said cutters thereby to prevent rotational movement about said cutters as a fulcrum of said material due to the action of said cutters, and means for adjusting said support, said reaction support being provided with a roller for engaging said material.

2. The combination with a shears for cutting sheet material and having a pair of cutters, of a lever pivoted to a fixed support, said lever having associated therewith a roller for engaging one side of the material being cut and a device for adjusting said lever to cause said roller to be pressed into engagement with said material.

3. The combination with a power driven shears for cutting sheet material comprising a pair of cutting blades, of a reaction support independent of the cutting blades and located in a rigidly resistant operative position adjacent to one of said blades and engaging a small surface area of one side of the material approximately in alignment with the center line of the zone of the effective cutting edges and a rotatable supporting member located adjacent to the other of said blades and engaging a small surface area of the other side of said material also in alignment with said center line.

4. A combination as set forth in claim 3 in which the stationary reaction support comprises a plate like member the work engaging surface of which is curved both transversely and longitudinally.

5. A combination as set forth in claim 3 in which the stationary reaction support has a work engaging surface the contour of which considered both longitudinally and transversely is approximately parabolic.

6. The combination with a power driven cutting shears including an upper blade and a movable lower blade adapted to cut sheet material and having a frame, of a reaction support normally located in a rigidly resistant operative position for engaging the upper surface of the material adjacent to the cutting blades of the shears, said support being pivotally connected to said frame for movement to and from said operative or material engaging position from and to an inoperative, out-of-the-way position.

7. The combination with a power driven cutting shears including a stationary upper blade and a movable lower blade adapted to cut sheet material and having a frame, of a reaction support normally located in a rigidly resistant operative position for engaging the upper surface of the material adjacent to the cutting blades of the shears, said support being pivotally connected to said frame for movement to and from said operative or material engaging position from and to an inoperative, out-of-the-way position and means to lock said support in its operative position against pivotal movement.

8. The combination with a power driven cutting shears including a stationary upper blade and a movable lower blade adapted to cut sheet material and having a frame, of a reaction support normally located in a rigidly resistant operative position for engaging the upper surface of the material adjacent to the cutting blades of the shears, said support being pivotally connected to said frame for movement to and from said operative or material engaging position from and to an inoperative, out-of-the-way position, means to lock said support in its operative position against pivotal movement and means to adjust it to and from the material.

9. The combination with a power driven shears for cutting sheet material and having a pair of cutting blades, of a stationary reaction support located adjacent to one of said blades and engaging a small surface area of one side of the material approximately in alignment with the center line of the zone of the effective cutting edges and a rotatable supporting member located adjacent to the other of said blades and engaging a small surface area the other side of said material also in alignment with said center line and a covering mat having sound deadening properties secured to said support for direct contacting engagement with said material.

10. The combination with a power driven shears for cutting sheet material and having a frame and a pair of cutting blades, of a pair of brackets secured to said frame, pivot pins carried by said brackets, a second pair of brackets pivotally mounted on said pins, each of said second brackets having mounted therein an adjusting screw and a material engaging member pivotally secured to the ends of said screws for movement to and from the material.

In testimony whereof we have hereunto set our hands.

ULRICH F. L. STEINDORFF.
GUSTAVE A. UNGAR.